United States Patent
Pathak et al.

(10) Patent No.: US 8,656,336 B2
(45) Date of Patent: Feb. 18, 2014

(54) PATTERN BASED METHOD FOR IDENTIFYING DESIGN FOR MANUFACTURING IMPROVEMENT IN A SEMICONDUCTOR DEVICE

(75) Inventors: Piyush Pathak, Sunnyvale, CA (US); Shobhit Malik, Sunnyvale, CA (US); Sriram Madhavan, Santa Clara, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/405,662

(22) Filed: Feb. 27, 2012

(65) Prior Publication Data

US 2013/0227498 A1 Aug. 29, 2013

(51) Int. Cl.
*G06F 17/50* (2006.01)

(52) U.S. Cl.
USPC .............................. 716/132; 716/52; 716/54

(58) Field of Classification Search
None
See application file for complete search history.

(56) References Cited

U.S. PATENT DOCUMENTS

| | | | |
|---|---|---|---|
| 6,066,179 A * | 5/2000 | Allan | 716/52 |
| 6,083,275 A * | 7/2000 | Heng et al. | 716/52 |
| 6,275,971 B1 * | 8/2001 | Levy et al. | 716/136 |
| 6,449,761 B1 * | 9/2002 | Greidinger et al. | 716/122 |
| 6,536,023 B1 * | 3/2003 | Mohan et al. | 716/112 |
| 6,874,133 B2 * | 3/2005 | Gopalakrishnan et al. | 716/122 |
| 6,941,528 B2 * | 9/2005 | Allen et al. | 716/122 |
| 6,973,637 B2 * | 12/2005 | Sharpe et al. | 430/311 |
| 7,076,749 B2 * | 7/2006 | Kemerer et al. | 716/52 |
| 7,159,197 B2 * | 1/2007 | Falbo et al. | 716/52 |
| 7,380,227 B1 * | 5/2008 | Li | 716/112 |
| 7,627,836 B2 * | 12/2009 | Culp et al. | 716/53 |
| 7,689,948 B1 * | 3/2010 | White et al. | 716/136 |
| 7,698,676 B1 * | 4/2010 | Qian | 716/119 |
| 7,735,056 B2 * | 6/2010 | Aton et al. | 716/50 |
| 8,302,051 B2 * | 10/2012 | Tsunoda | 716/111 |
| 8,381,141 B2 * | 2/2013 | Fischer et al. | 716/53 |
| 2004/0111682 A1 * | 6/2004 | Gopalakrishnan et al. | 716/2 |
| 2004/0230938 A1 * | 11/2004 | Sharpe et al. | 716/21 |
| 2010/0162194 A1 * | 6/2010 | Qian | 716/11 |

* cited by examiner

*Primary Examiner* — Leigh Garbowski

(74) *Attorney, Agent, or Firm* — Amerson Law Firm, PLLC

(57) ABSTRACT

A method includes receiving a design layout file for an integrated circuit device in a computing apparatus. The design layout file specifies dimensions of a plurality of features. Outer markers are generated in the computing apparatus for at least a subset of the features based on the proximity of the features to one another and spacing requirements. Features are identified in the computing apparatus where the associated outer marker has at least one dimension greater than the dimensions specified for the feature.

22 Claims, 5 Drawing Sheets

PATTERN BASED METHOD FOR IDENTIFYING DESIGN FOR MANUFACTURING IMPROVEMENT IN A SEMICONDUCTOR DEVICE

CROSS-REFERENCE TO RELATED APPLICATIONS

Not applicable.

BACKGROUND

The disclosed subject matter relates generally to integrated circuit device manufacturing and, more particularly, to a pattern based method for identifying design for manufacturing improvement in a semiconductor device.

The formation of various integrated circuit (IC) structures on a wafer often relies on lithographic processes, sometimes referred to as photolithography, or simply lithography. As is well known, lithographic processes can be used to transfer a pattern of a photomask (i.e., also referred to as a mask or a reticle) to a wafer. There is a pervasive trend in the art of IC fabrication to increase the density with which various structures are arranged. For example, feature size, line width, and the separation between features and lines are becoming increasingly smaller. In these sub-micron processes, yield is affected by factors such as mask pattern fidelity, optical proximity effects, and photoresist processing. Some of the more prevalent concerns include line end pullback, corner rounding and line-width variations. These concerns are largely dependent on local pattern density and topology.

Integrated circuit devices are formed in layers. Interconnect structures, such as trenches, vias, etc. are used to form interlayer connections between features, such as lines. For example, a via may be used to connect a line feature, such as a gate electrode, in a first layer to a metal line feature in another layer formed above the first layer. The accuracy at which the interconnect structures align with underlying features affects the functionality of the device. Misalignments may cause performance degradation and or device failure. Misalignment errors may arise from misregistration during the patterning processes to form the features of the various layers (i.e., the layers are not aligned accurately) or due to variations in the dimensions of the features themselves (e.g., due to proximity effects).

Integrated circuit devices are typically designed with some degree of margin to allow for some degree of misalignment. In general, increasing the margin increases the manufacturability of the device by reducing the likelihood of a yield issue. However, there is a trade-off between margin and pattern density. Increased dimensions result in decreased pattern densities. There are design rules for an integrated circuit that specify parameters such as how closely adjacent features may be formed. Design rules are specified in manner that takes into account manufacturing limitations such as overlay and/or optical proximity effects. Increasing the margin for a given feature may result in the violation of one or more of the design rules unless the spacing is increased.

During the design process various tools may be used to check the design. A design rule checker may be used to verify that none of the patterns violates a design rule. A design for manufacturability (DFM) tool may be used to generate a score for the design representing the likelihood that the device can be manufactured without pattern based yield issues. The DFM unit may identify regions or patterns in the device that have a relatively significant likelihood of being improperly formed during the fabrication process, commonly referred to as "hot spots." Once, a hot spot has been identified, a designer manually evaluates the region and may attempt to change one or more of the dimensions of the features in the region to improve manufacturability. After these changes, the analysis of the design must be repeated to identify if any improvements in the DFM score have been achieved. This design revision process is time consuming and iterative, as it is difficult to estimate the DFM improvements that will from the design changes.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method including receiving a design layout file for an integrated circuit device in a computing apparatus. The design layout file specifies dimensions of a plurality of features. Outer markers are generated in the computing apparatus for at least a subset of the features based on the proximity of the features to one another and spacing requirements. Features are identified in the computing apparatus where the associated outer marker has at least one dimension greater than the dimensions specified for the feature.

Another aspect of the disclosed subject matter is seen a method that includes receiving a design layout file for an integrated circuit device in a computing apparatus. The design layout file specifies dimensions of at least a first feature. An outer marker for the first feature is generated in the computing apparatus having at least one dimension greater than the dimensions specified for the first feature. A first weighting factor for the first feature is generated in the computing apparatus based on the outer marker.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
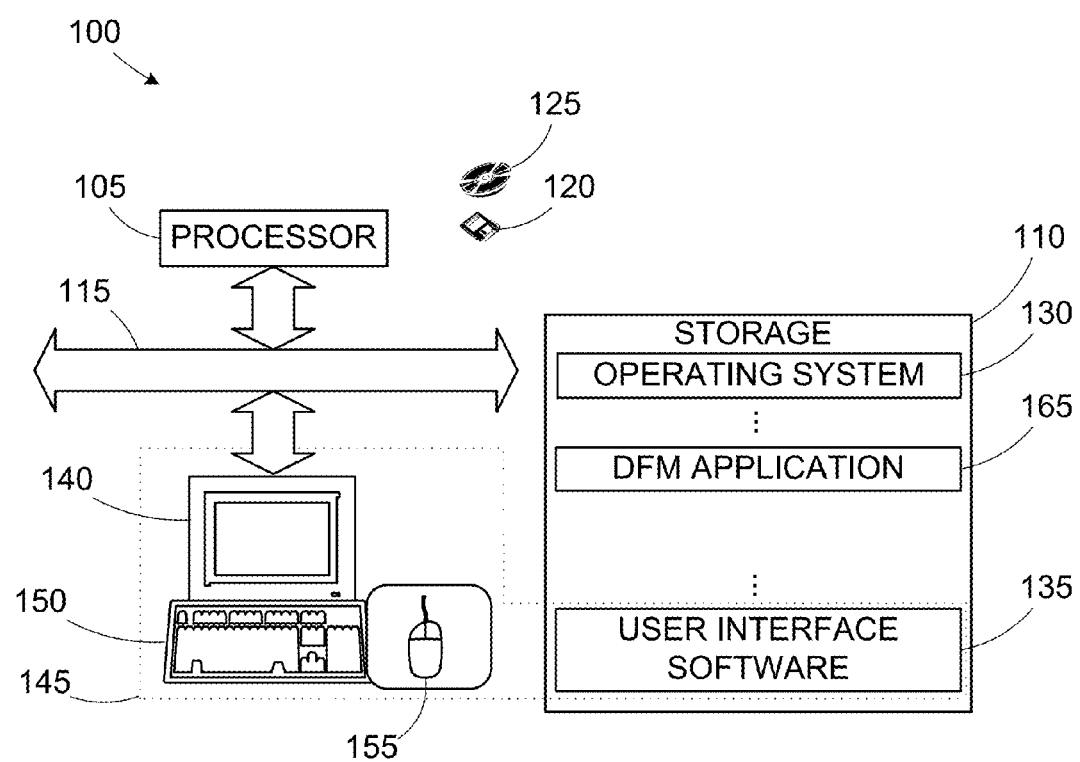
FIG. 1 is a simplified diagram of a computing apparatus for evaluating designs of semiconductor devices in accordance with an illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present subject matter shall be described in the context of an illustrative design analysis computing apparatus 100 for evaluating designs of semiconductor devices. The computing apparatus 100 includes a processor 105 communicating with storage 110 over a bus system 115. The storage 110 may include a hard disk and/or random access memory ("RAM") and/or removable storage, such as a magnetic disk 120 or an optical disk 125. The storage 110 is also encoded with an operating system 130, user interface software 135, and a design for manufacturing (DFM) application 165. The user interface software 135, in conjunction with a display 140, implements a user interface 145. The user interface 145 may include peripheral I/O devices such as a keypad or keyboard 150, mouse 155, etc. The processor 105 runs under the control of the operating system 130, which may be practically any operating system known in the art. The DFM application 165 is invoked by the operating system 130 upon power up, reset, user interaction, etc., depending on the implementation of the operating system 130. The DFM application 165, when invoked, performs a method of the present subject matter. The user may invoke the DFM application 165 in conventional fashion through the user interface 145. Note that although a stand-alone system is illustrated, there is no need for the data to reside on the same computing apparatus 100 as the DFM application 165 by which it is processed. Moreover, the DFM application 165 may include multiple components that may reside on different computing apparatuses 100. Some embodiments of the present subject matter may therefore be implemented on a distributed computing system with distributed storage and/or processing capabilities.

It is contemplated that, in some embodiments, the DFM application 165 may be executed by the computing apparatus 100 to evaluate semiconductor device design data and generate DFM scores for the design or portions of the design. Data for the DFM evaluation may be stored on a computer readable storage device (e.g., storage 110, disks 120, 125, solid state storage, and the like).

Portions of the subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
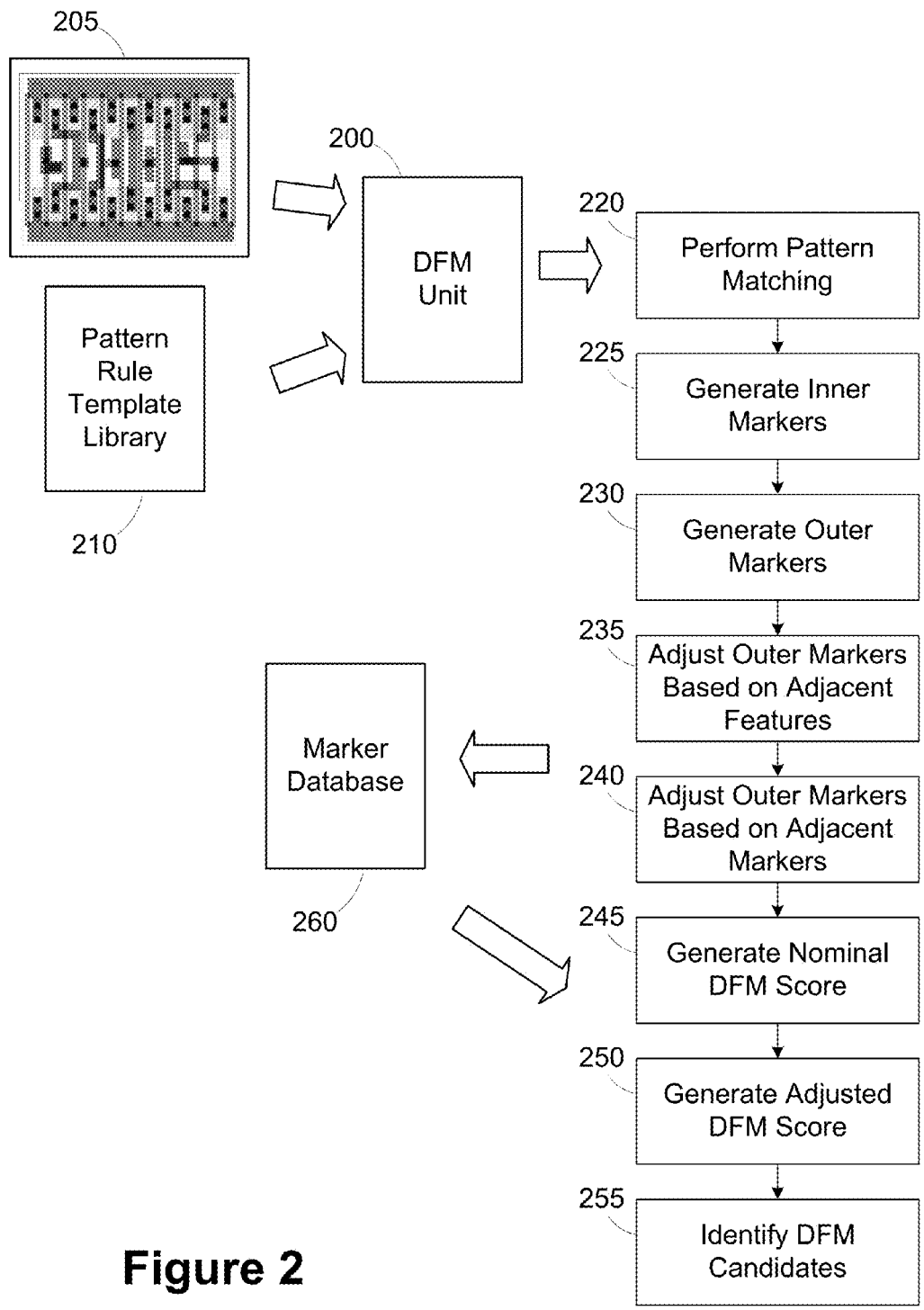
FIG. 2 is a flow diagram illustrating the operation of a DFM unit implemented by the computing apparatus of FIG. 1.

A general process flow for the computing apparatus 100 in implementing the DFM activities of the DFM application 165 is shown in FIG. 2. The computing apparatus 100 implementing the DFM application 165 is represented by a DFM unit 200. Inputs to the DFM unit 200 include a design layout file 205 and a library of pattern rule templates 210. Each pattern rule template defines parameters for a class of features present in the design layout file 205 for which DFM scoring is to be conducted.

Figure 3A:
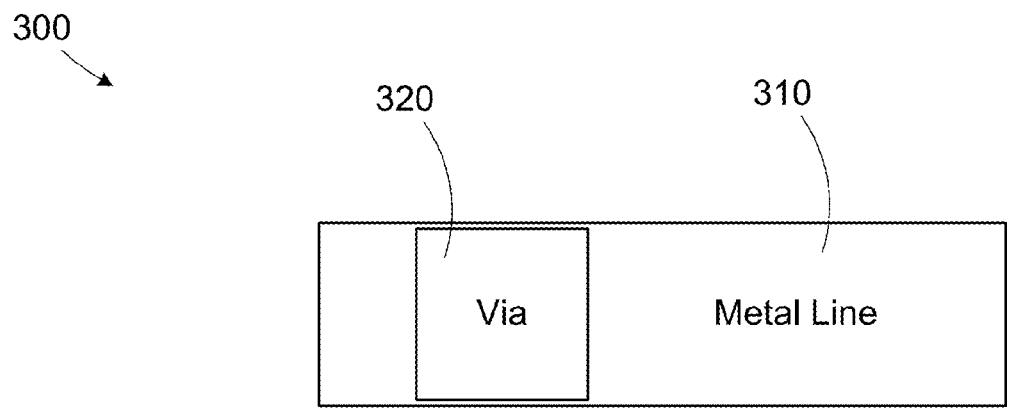
FIGS. 3a-3e are diagrams of a device feature illustrating the use of inner and outer markers for evaluating design for manufacturability dimensional improvements.

An exemplary feature 300 associated with a pattern rule template is shown in FIG. 3a. The feature 300 includes a metal line 310 in one layer of an integrated circuit device and a via 320 formed in a layer above the metal line 310 that electrically connects to the metal line 310. The pattern rule template associated with the feature 300 is related to the metal line end enclosure of the via 320. In general, the higher the degree of metal line end enclosure, the higher the likelihood that the via 320 may be formed and reliably contact the underlying metal line 310.

Table 1 illustrates exemplary parameters for the pattern rule template associated with the feature 300.

TABLE 1

Pattern Rule Template

| Input Property | Parameter |
|---|---|
| Via Length | a |
| Maximum side end enclosure | p |
| Maximum line end enclosure | e2 |
| Minimum line end enclosure | e1 |
| Minimum via edge enclosure opposite to line end | l1 |
| Minimum side end space | cs |
| Minimum line end space | Ce |
| Input layers | {L1, L2} - {Metal, Via} |
| Pattern Radius | r |

Figure 3B:
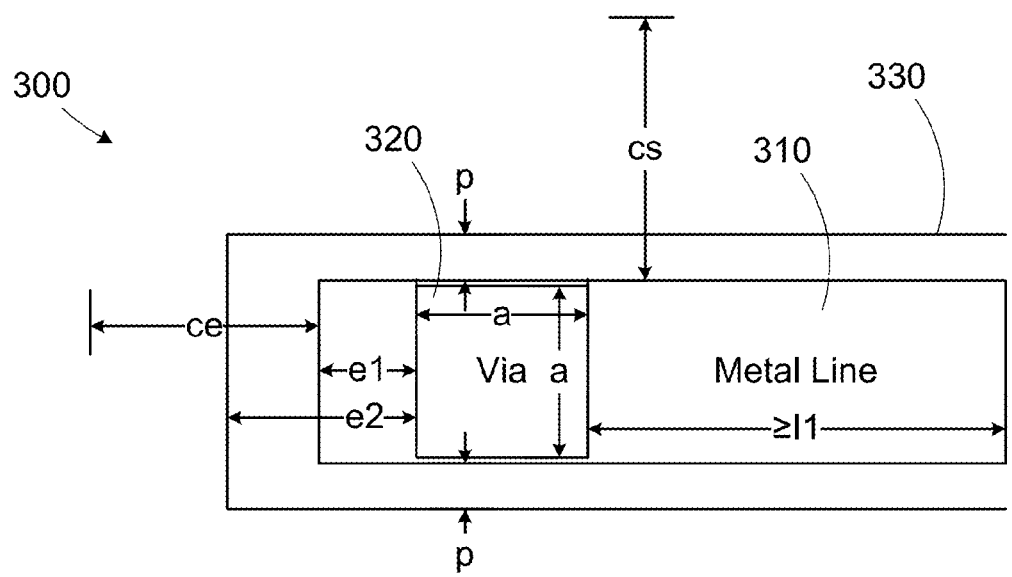

The template defines parameters of the features that are covered by the template. However, the template covers a range of similar features on the integrated circuit that do not have the exact same dimensions as the feature 300. As shown in FIG. 3b, the template defines a via size, a, a minimum line end enclosure, e1, a maximum line end enclosure, e2, a maximum side end enclosure, p, and a minimum via edge enclosure opposite to the line end, l1, that define a reference boundary 330 for the class of features that include the feature 300. Thus, any features in the layout that fit between the maximum and minimum dimensions of the reference boundary 330 in FIG. 3b are considered to be within the scope of the template and will be scored for DFM purposes using the pattern rule template. Generally, the closer the actual metal features are to the maximum dimensions of the reference boundary 330, the higher the DFM score. The template also specifies the layers covered {L1,L2}, and minimum spacing parameters (i.e., cs and ce) associated with the feature 300 and neighboring features. Generally, the minimum side end space, cs, and the minimum line end space, ce, represent design rules associated with the integrated circuit device. The minimum spacing parameters attempt to address optical proximity effects to provide adequate pattern resolution. The pattern radius, r, specifies a window around the central element in the feature 300 (e.g., the via 320) that is used for pattern matching.

Returning to FIG. 2, method blocks 220-255 represent a simplified flow diagram of a method implemented by the DFM unit in accordance with the present subject matter. This method is described with reference to the diagrams of the feature 300 illustrated in FIGS. 3a-3e. In method block 220, the DFM unit 200 performs pattern matching using the design layout file 205 and the pattern rule template library 210. Techniques for pattern matching are known in the art, and for clarity and ease of illustration, they are not described in detail herein. In general, the DFM unit 200 finds features in the design layout file 205 that fit the parameters defined by the pattern rule templates 210, as described above with reference to FIGS. 3a and 3b.

As described above, the closer the dimensions of the actual metal feature are to the maximum dimensions, the higher the DFM score. In general, the DFM unit 200 attempts to identify opportunities for DFM improvement by identifying features for which the dimensions may be increased without violating any design rule constraints. Increasing the dimensions increases the manufacturing margins and thereby reduces the likelihood that a yield problem will arise for the adjusted feature.

Figure 3C:
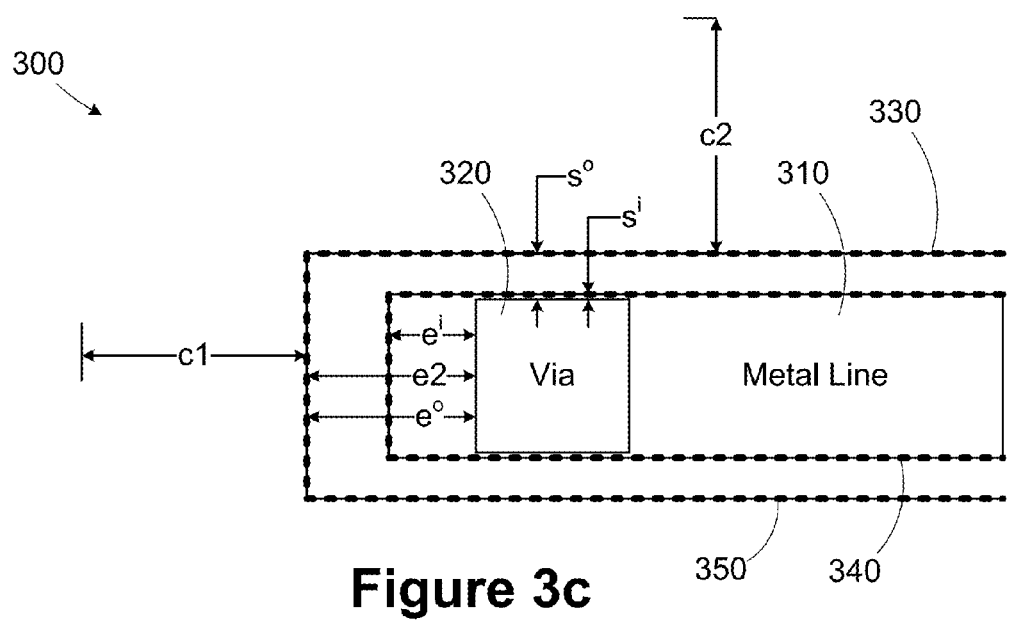

In method block 225, the DFM unit 200 generates an inner marker 340 (represented by the dashed line) for the feature 300, as illustrated in FIG. 3c. The inner marker 340 corresponds to the dimensions of the actual feature 300 (i.e., the line 310). The inner marker 340 defines an inner marker line end enclosure, $e^i$, and an inner marker side end enclosure, $s^i$, defined by the relationships:

$$0 \le s^i \le p,$$

and $$e1 \le e^i \le e2.$$

In method block 230, the DFM unit 200 generates an outer marker 350 corresponding to the maximum dimensions of the reference boundary 330. The outer marker 350 defines an outer marker line end enclosure, $e^o$, and an outer marker side end enclosure, $s^o$. The outer marker 350 also defines an outer marker minimum line end space, c1, and an outer marker minimum side end space, c2, defining the minimum spacing between the outer marker 350 and the nearest metal features in the end direction and the side direction, respectively.

Table 2 illustrates exemplary parameters for the marker entry associated with the feature 300. The parameters for the inner and outer markers 340, 350 are stored as a marker entry for the feature 300 in a marker database 260. An entry in the marker database 260 is created for each feature in the design layout file 205 meeting the parameters of the pattern rule template.

TABLE 1

Marker Entry

| Input Property | Parameter |
|---|---|
| Line end enclosure of via by inner marker | $e^i$ |
| Line end enclosure of via by outer marker | $e^o$ |
| Side end enclosure of via by inner marker | $s^i$ |
| Side end enclosure of via by outer marker | $s^o$ |
| Minimum line end space found between outer marker and nearest metal geometry | c1 |
| Minimum side end space found between outer marker and nearest metal geometry | c2 |

As described above, the maximum DFM improvement could be achieved if the line 310 were to be formed with dimensions corresponding to the maximum bounds of the reference boundary 330. However, if all features in the design layout file 205 were to be formed with maximum dimensions, it would be likely that some of the features would violate design rule spacing requirements. The DFM unit 200 identifies how much the feature dimensions could be adjusted without violating the design rule requirements.

Figure 3D:
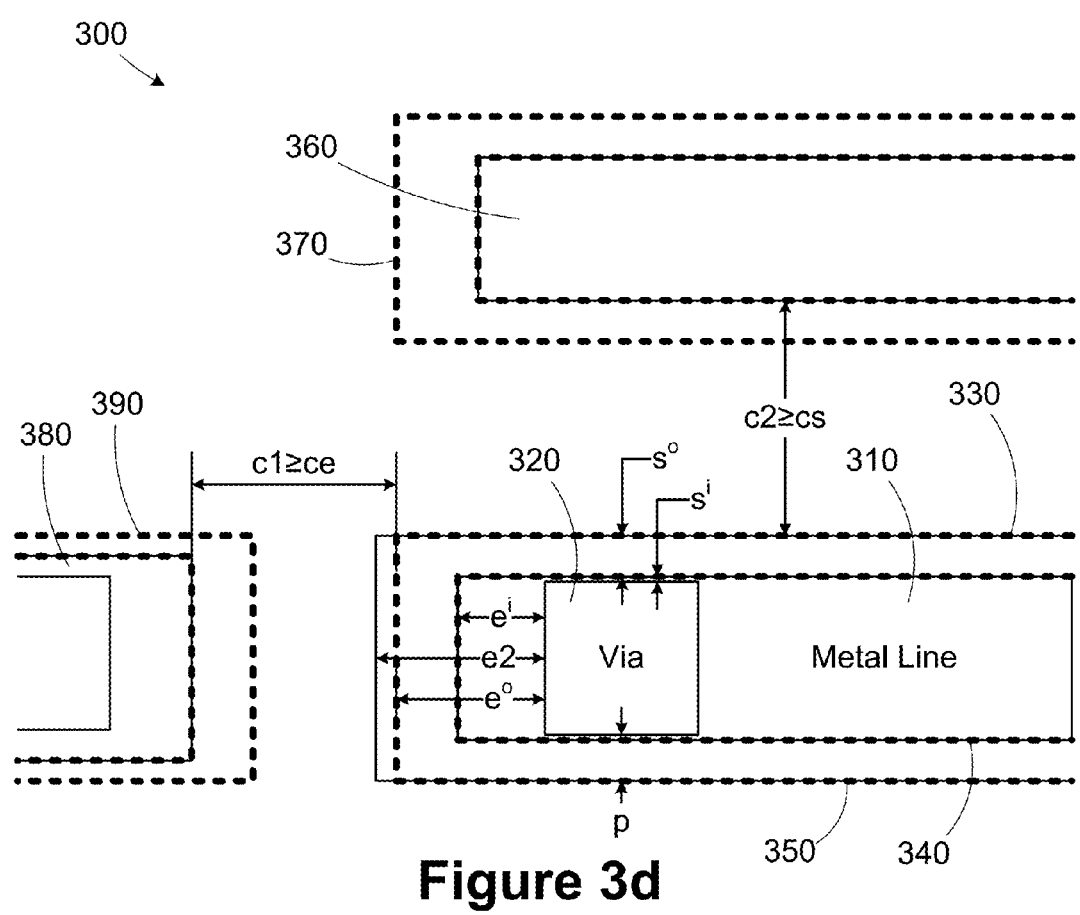

As shown in FIG. 3d, a feature 360 with its own outer marker 370 is disposed adjacent a side region of the feature 300 and a feature 380 with an outer marker 390 is disposed adjacent an end region of the feature 300. In the illustrated example, the feature 360 is a line feature and the feature 380 is a line feature with a via, similar to the feature 300. As the features 300 and 380 are in the same feature class (i.e., metal line end enclosure of via), they may have be associated with the same pattern rule template and their outer markers may be defined as shown in FIG. 3c. However, as the feature 360 is in a different feature class, its outer marker may be defined in accordance with a different patter rule template.

In method block 235, the DFM unit 200 adjusts the outer marker 350 based on adjacent features in the design layout file 205. The DFM unit 200 adjusts the outer marker 350 based on its proximity to the actual metal features 360, 380 using the spacing constraints:

$$(s^i \leq s^o \leq p) \cap (c2 \geq cs),$$

and $$(e^i \leq e^o \leq e2) \cap (c1 \geq ce)$$

Because the spacings c1 and c2 are less than the minimum spacings, ce and cs, the outer marker 340 is moved in until the constraints are satisfied. The outer markers 370 and 390 are adjusted in a similar manner based on the spacings between the markers 370 and 390 and the feature 300.

If all features were allowed to extend to the maximum allowed based on the outer markers 350, 370, and 390 based on the marker-to-feature spacings, the minimum spacings could still be violated. Thus, in method block 240, the DFM unit 200 adjusts the outer marker 350 again based on marker-to-marker spacings between the outer markers 370, 390 of the adjacent features 360, 380 in the design layout file 205.

Figure 3E:
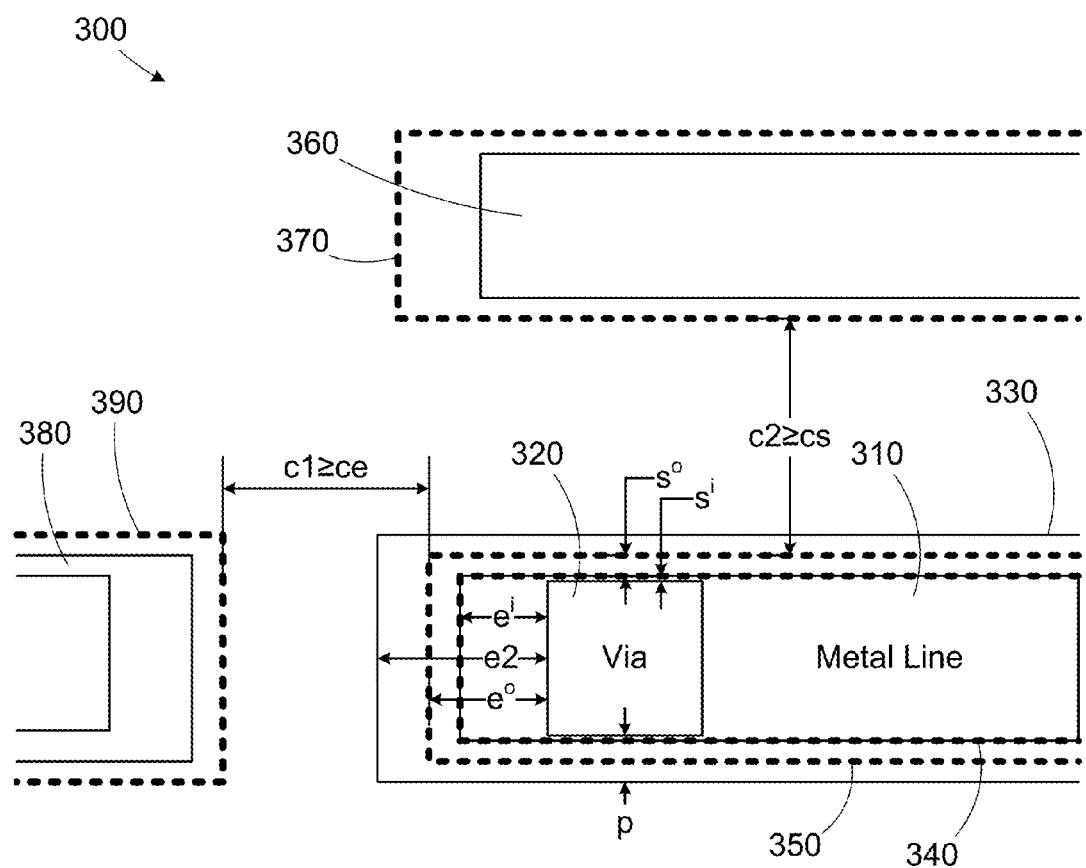

There are various techniques that may be used to adjust the outer markers 350, 370, 390. In one embodiment, the required spacing is recovered by moving each conflicting outer marker back by half the required amount, as illustrated in FIG. 3e (i.e., weight=½). Hence, the marker-to-marker spacing meets the constraints, cs and ce. In another embodiment, an uneven weighted technique may be used to allocate the recovered spacing. For instance, if the feature 360 already has an end enclosure greater than the feature 300, the outer marker 370 may be moved more than the outer marker 350 to recover the spacing. Depending on the amount of end enclosure, the outer marker 350 may not need to be moved at all (i.e., feature 300 weight=0, feature 360 weight=1). In yet another embodiment, the weighting may be done based on priorities associated with the pattern rule templates. For example, if the metal line end enclosure of via pattern rule template is ranked higher in priority than the pattern rule template associated with the feature 380, the weighting may favor the feature 350 (i.e., feature 300 weight=0, feature 380 weight=1). As will be described in greater detail below, the DFM unit 200 generated DFM scores based on the markers to identify opportunities for DFM improvement. In the context of marker-to-marker spacing conflict resolution, it is contemplated that the DFM may use different priority schemes for resolving the spacing conflicts and identify which scheme achieves the most DFM improvement.

In method block 245, the DFM unit 200 generates a nominal DFM score for the integrated circuit device based on the inner markers, which correspond to the actual dimensions of the features of the device. This nominal score reflects the DFM score that would be achieved if the device were to be fabricated in accordance with the design layout file 205 without modification and scored based on the pattern rule templates. Hence, the nominal score represents a baseline score for the current design against which improvements may be measured. The DFM score is generated as a function of feature weightings that reflect how close the feature is to the reference dimensions specified by the reference boundary 330.

$$wt_j^{Inner} = \left[\frac{(a+e^i) \times (a+s^i+s^i) - (a+e1) \times a}{(a+e2) \times (a+p+p)}\right]^\alpha$$

The weighting is based on the enclosure area of the line in the region of the via for the inner marker parameters ($e^i$ and $s^i$) less the minimum enclosure area defined by the minimum parameters (e1 and $s^i$=0), all divided by the maximum enclosure area defined by the reference boundary 330. The weighting function may take the form of a general power-law equation, where the α term represents the power. For example, in a quadratic scoring technique for the weighting function, a becomes two.

A score for an individual feature, may be defined as a function of the weighting parameter for the feature, $$fn(wt_j^{Inner})$$

Particular scoring functions are known to those of ordinary skill in the art, and the present subject matter is not limited to a particular scoring function. A nominal design score for a given rule, k, may be determined based on the product of the scores for the j individual features.

$$(\text{Nominal Design Score})^{Rule_k} = \prod_{j=1}^{count} fn(wt_j^{Inner})$$

In method block 250, the DFM unit 200 generates an adjusted DFM score for the integrated circuit device based on the outer markers. This adjusted score reflects the improvement in manufacturability that could be achieved if the device were to be fabricated in accordance with the outer markers. Again, the feature weighting reflect how close the feature is to the reference dimensions specified by the reference boundary 330.

$$wt_j^{Outer} = \left[\frac{(a+e^o) \times (a+s^o+s^o) - (a+e1) \times a}{(a+e2) \times (a+p+p)}\right]^\alpha$$

The weighting is based on the enclosure area of the line in the region of the via for the outer parameters ($e^o$ and $s^o$) less the minimum enclosure area for the minimum parameters (e1 and $s^i$=0), all divided by the maximum enclosure area of the line defined by the reference boundary 330. The adjusted design score for a given rule, k, may be determined based on the product of the scores for the j individual features.

$$(\text{Adjusted Design Score})^{Rule_k} = \prod_{j=1}^{count} fn(wt_j^{Outer})$$

As is known in the art, a combined score may be generated based on the rule scores. For example, a Poisson function may be applied to the plurality of rule scores to generate an overall score for the design. Again, the particular scoring functions are known to those of ordinary skill in the art, and the application of the present subject matter is not limited to a particular score.

As described above, different techniques may be used for resolving outer marker conflicts. Adjusted design scores may be determined for the different resolution techniques to determine which technique generates the best results.

In method block 255, the DFM unit 200 identifies a list of features that are candidates for DFM improvement. The list may identify the dimensions of the outer markers and may also provide the nominal and adjusted weighting for the individual feature to allow a designer to determine if the outer marker adjustments should be implemented.

Evaluating integrated circuit designs using the techniques described herein allows designers to identify candidates for which DFM improvements may be implemented and also provides metrics for estimating the efficacy of the improvements.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
receiving a design layout file for an integrated circuit device in a computing apparatus, the design layout file specifying dimensions of a plurality of features;
identifying a subset of features within the design layout file whose dimensions may be increased without violating any design rule constraints for the design layout;
generating outer markers in the computing apparatus for at least some of said subset of features based on the proximity of the features to one another and spacing requirements; and
identifying features in the computing apparatus where the associated outer marker has at least one dimension greater than the dimensions specified for the feature.

2. The method of claim 1, further comprising generating weighting factors for each of the features based on the associated outer markers.

3. The method of claim 2, further comprising generating a design for manufacturability score for the integrated circuit device in the computing apparatus based on the weighting factors.

4. The method of claim 1, wherein identifying said subset of the features comprises identifying features having dimensions that fall within a reference boundary specifying minimum and maximum reference dimensions and wherein the method further comprises:
generating weighting factors for each of the features in the subset as a function of a difference between the reference boundary and dimensions of the associated outer marker for the feature; and
generating a design for manufacturability score for subset of features based on the weighting factors.

5. The method of claim 4, wherein generating the outer markers further comprises:
generating an outer marker for each feature using the reference boundary; and
adjusting the outer markers of the features based on the proximity of the outer markers to adjacent features to satisfy the spacing requirements.

6. The method of claim 5, further comprising re-adjusting the outer markers to satisfy the spacing requirements between the outer markers and the outer markers of adjacent features.

7. A method, comprising:
receiving a design layout file for an integrated circuit device in a computing apparatus, the design layout file specifying dimensions of at least a first feature whose dimensions may be increased without violating any design rule constraints for the design layout;
generating an outer marker for the first feature in the computing apparatus having at least one dimension greater than the dimensions specified for the first feature; and
generating a first weighting factor for the first feature in the computing apparatus based on the outer marker.

8. The method of claim 7, further comprising generating a design for manufacturability score for the integrated circuit device in the computing apparatus based on the first weighting factor.

9. The method of claim 7, further comprising:
generating an inner marker for the first feature having dimensions corresponding to the specified dimensions;
generating a second weighting factor for the first feature in the computing apparatus based on the inner marker;
generating a nominal design for manufacturability score for the integrated circuit device in the computing apparatus based on the second weighting factor; and
generating an adjusted design for manufacturability score for the integrated circuit device in the computing apparatus based on the first weighting factor.

10. The method of claim 7, wherein the first feature has an associated reference boundary specifying minimum and maximum reference dimensions for a class of features including the first feature, and generating the first weighting factor comprises generating the first weighting factor as a function of a difference between the reference boundary and the outer marker dimensions.

11. The method of claim 10, wherein the first feature comprises a first element in a first layer and a second element in a second layer overlying the first feature, and generating the first weighting factor comprises:
determining a first enclosure area for the first element and the second element based on the outer marker;
determining a minimum enclosure area based on the reference boundary;
determining a maximum enclosure area based on the reference boundary;
subtracting the minimum enclosure area from the first enclosure area and dividing the difference by the maximum enclosure area.

12. The method of claim 7, wherein the first feature has an associated reference boundary specifying maximum reference dimensions for a class of features including the first feature, and generating the outer marker further comprises:
generating the outer marker based on the reference boundary; and
adjusting the outer marker based on a proximity of the outer marker to a second feature of the integrated circuit device.

13. The method of claim 12, wherein adjusting the outer marker comprises adjusting the outer marker to satisfy a minimum spacing between the outer marker and the second feature.

14. The method of claim 13, further comprising re-adjusting the outer marker to satisfy a minimum spacing between the outer marker and an outer marker of the second feature.

15. The method of claim 14, wherein re-adjusting the outer marker comprises adjusting the outer marker of the first feature and the outer marker of the second feature evenly.

16. The method of claim 14, wherein re-adjusting the outer marker comprises adjusting the outer marker of the first feature and the outer marker of the second feature using a weighted adjustment.

17. A computing apparatus, comprising:
   storage for receiving a design layout file for an integrated circuit device, the design layout file specifying dimensions of a plurality of features;
   a design for manufacturability unit operable to generate outer markers for at least a subset of the features whose dimensions may be increased without violating any design rule constraints for the design layout based on the proximity of the features to one another and spacing requirements and identify features where the associated outer marker has at least one dimension greater than the dimensions specified for the feature.

18. The apparatus of claim 17, wherein the design for manufacturability unit is operable to generate weighting factors for each of the features based on the associated outer markers.

19. The apparatus of claim 18, wherein the design for manufacturability unit is operable to generate a design for manufacturability score for the integrated circuit device in the computing apparatus based on the weighting factors.

20. The apparatus of claim 17, wherein the design for manufacturability unit is operable to identify a subset of the features having dimensions that fall within a reference boundary specifying minimum and maximum reference dimensions, generate weighting factors for each of the features in the subset as a function of a difference between the reference boundary and dimensions of the associated outer marker for the feature, and generate a design for manufacturability score for subset of features based on the weighting factors.

21. The apparatus of claim 20, wherein the design for manufacturability unit is operable to generate the outer markers by generating an outer marker for each feature using the reference boundary and adjusting the outer markers of the features based on the proximity of the outer markers to adjacent features to satisfy the spacing requirements.

22. The apparatus of claim 21, wherein the design for manufacturability unit is operable to re-adjust the outer markers to satisfy the spacing requirements between the outer markers and the outer markers of adjacent features.

* * * * *